(12) United States Patent
Goman et al.

(10) Patent No.: US 7,500,601 B2
(45) Date of Patent: Mar. 10, 2009

(54) SMART CARD PERSONALIZATION IN A MULTISTATION ENVIRONMENT

(75) Inventors: Robert Neal Goman, Minneapolis, MN (US); Denis C. Burand, Excelsior, MN (US); Thomas L. Younger, Wayzata, MN (US)

(73) Assignee: Card Technology Corporation, Paramus, NJ (US)

( * ) Notice: Subject to any disclaimer, the term of this patent is extended or adjusted under 35 U.S.C. 154(b) by 0 days.

(21) Appl. No.: 10/693,836

(22) Filed: Oct. 23, 2003

(65) Prior Publication Data

US 2004/0256451 A1 Dec. 23, 2004

Related U.S. Application Data

(63) Continuation of application No. 09/798,455, filed on Mar. 2, 2001, now abandoned, which is a continuation of application No. 09/076,022, filed on May 11, 1998, now Pat. No. 6,196,459.

(51) Int. Cl.
G06K 5/00 (2006.01)
(52) U.S. Cl. .................................. 235/380; 235/492
(58) Field of Classification Search ................ 235/380, 235/492; 706/10
See application file for complete search history.

(56) References Cited

U.S. PATENT DOCUMENTS

| | | | |
|---|---|---|---|
| 4,772,782 A | 9/1988 | Nonat | |
| 4,825,054 A * | 4/1989 | Rust et al. | ..................... 235/380 |
| 4,827,425 A * | 5/1989 | Linden | ....................... 700/225 |
| 4,874,935 A | 10/1989 | Younger | |
| 5,025,399 A | 6/1991 | Wendt et al. | |
| 5,266,781 A | 11/1993 | Warwick et al. | |
| 5,534,857 A | 7/1996 | Laing et al. | |
| 5,557,679 A | 9/1996 | Julin et al. | |

(Continued)

FOREIGN PATENT DOCUMENTS

EP 0706150 B1 4/1995

(Continued)

OTHER PUBLICATIONS

"U.S. Appl. No. 09/076,022 Response filed on Jan. 5, 2000 to Non-Final Office Action mailed Oct. 5, 1999", (Jan. 5, 2000),5.

(Continued)

Primary Examiner—Karl D. Frech
(74) Attorney, Agent, or Firm—Schwegman, Lundberg & Woessner, P.A.

(57) ABSTRACT

A smart card personalization system provides an interface to smart card personalization stations and to external computing or data resources which normally are not available directly to personalization station. A card issuer management systems prepares card objects and assigns a unique card object identifier. A smart card personalization server receives the card objects from the card issuer management system. A smart card personalization controller receives the unique card object identifiers and routes the card object identifiers to waiting personalization stations. The personalization stations use the card object identifier to request data and services from the smart card personalization server in order to personalize the smart card. The services provided by the smart card personalization server include data services, security services and support services. The smart card personalization server supports multiple active personalization station sessions.

9 Claims, 4 Drawing Sheets

U.S. PATENT DOCUMENTS

| | | | |
|---|---|---|---|
| 5,640,193 | A | 6/1997 | Wellner |
| 5,684,742 | A | 11/1997 | Bublitz et al. |
| 5,712,979 | A | 1/1998 | Graber et al. |
| 5,799,316 | A | 8/1998 | Audren |
| 5,889,941 | A | 3/1999 | Tushie et al. |
| 6,196,459 | B1 * | 3/2001 | Goman et al. ............... 235/380 |
| 2002/0002145 | A1 | 1/2002 | Cronstein et al. |

FOREIGN PATENT DOCUMENTS

| | | |
|---|---|---|
| EP | 706150 A1 | 4/1996 |
| JP | 07334631 | 12/1995 |
| JP | 08-212310 | 8/1996 |
| WO | WO-95/22810 | 8/1995 |
| WO | WO-98/09257 | 8/1997 |
| WO | WO-97/39424 | 10/1997 |
| WO | WO-98/18106 | 4/1998 |
| WO | WO-9959109 A1 | 11/1999 |

OTHER PUBLICATIONS

"Final office action mailed Mar. 1, 2000 in U.S. Appl. No. 09/076,022", 9 pgs.

"International Search Report for PCT/US1999/10328, mailed Sep. 10, 1999", (Sep. 10, 1999),7.

"Non-final office action mailed Apr. 23, 2003 in U.S. Appl. No. 09/798,455", 7 pgs.

"Non-final office action mailed Oct. 5, 1999 in U.S. Appl. No. 09/076,022", 8 pgs.

"Notice of allowance mailed Sep. 15, 2000 in U.S. Appl. No. 09/076,022", 13 pgs.

"Response filed Aug. 30, 2000 to final office action mailed May 1, 2000 in U.S. Appl. No. 09/076,022", 6 pgs.

"Response to the Written Opinion filed on Jun. 16, 2000 for PCT/US1999/10328", (Jun. 16, 2000),5

"Written Opinion for PCT/US1999/10328, mailed Feb. 17, 2000", (Feb. 17, 2000),8.

"Austrailia Application No. 2003236380 Examiner's First Report mailed May 30, 2005", (May 30, 2005),2.

"Austrailia Serial No. 38985/99 Examiner's First Report mailed Nov. 27, 2007", (Nov. 27, 2001),1 page.

"China Application No. 99808521.9 Decision on Rejection mailed Sep. 10, 2004", (Sep. 10, 2004),5.

"China Application No. 99808521.9 First Office Action mailed Jul. 4, 2003", (Jul. 4, 2003),12.

"China Application No. 99808521.9 Request for ReExamination mailed on Dec. 10, 2004", (Dec. 10, 2004),8.

"China Application No. 99808521.9 Response to First Office Action filed Jun. 9, 2004", (Jun. 9, 2004),6.

"European Application No. 99921884.5 Amendment and Response filed on Nov. 29, 2004", (Nov. 29, 2004),14.

"European Application No. 99921884.5 Article 96(2) Communication mailed on Feb. 6, 2004", (Feb. 6, 2004),2.

"Malaysian Application No. P1 9901867 Amendments filed on May 4, 2001", (May 4, 2001),11.

"Malaysian Application No. P1 9901867 Modified Substantive Examination Clear Report mailed on Sep. 18, 2003", (Sep. 18, 2003),2.

"Mexican Application No 11070 Office Action Response filed Jan. 10, 2005", (Jan. 10, 2005),3.

"Philippines Application No. 1-1999-01090 Office Action Paper No. 12 mailed Jun. 24, 2005", (Jun. 24, 2005),1 page.

"Philippines Application No. 1-1999-01090 Office Action Paper No. 8 mailed on Oct. 30, 2003", (Oct. 30, 2003),1 page.

"Philippines Application No. 1-1999-01090 Office Action Response filed Apr. 29, 2004", (Apr. 29, 2004),1 page.

"Taiwan Application No. 1-999-01090 Notice of Allowance mailed Feb. 1, 2000", (Feb. 1, 2000),2.

"U.S. Appl. No. 90/008,517 Correction of Defects in Request for Reexamination as filed on Apr. 4, 2007", (Apr. 4, 2007),9 pages.

"U.S. Appl. No. 90/008,517 Decision on Petition under 37 CFR 1.181 mailed on Jul. 20, 2007", (Jul. 20, 2007),7 pages.

"U.S. Appl. No. 90/008,517 Ex Parte Reexamination Filed", (Mar. 5, 2007), 134 pages.

"U.S. Appl. No. 90/008,517 Notice of Assignment of Reexamination Request", (Mar. 14, 2007),1 page.

"U.S. Appl. No. 90/008,517 Notice of Reexamination Request Filing Date as mailed on Mar. 14, 2007", (Mar. 14, 2007),1 page.

"U.S. Appl. No. 90/008,517 Order Granting/Denying Request for Ex Parte Reexamination mailed May 4, 2007", (May 4, 2007),17 pages.

"U.S. Appl. No. 90/008,517 Patent Owner's Statement filed Sep. 20, 2007", (Sep. 20, 2007),28 pages.

"U.S. Appl. No. 90/008,517 Petition from Denial of Request for Reexamination under 37 CFR 1.181(b) filed on Jun. 4, 2007", (Jun. 4, 2007),30 pages.

"U.S. Appl. No. 90/008,517 Reply to Patent Owner's Statement mailed Nov. 20, 2007", (Nov. 20, 2007),36 pages.

Fox, Armando, et al., "Security on the Move: Indirect Authentication Using Kerberos", *University of California at Berkeley*; (fox. gribble)@cs.berkeley.edu; *at least by 1998*, (1998).

Kasper, P.A., et al., "Automating Solaris Installations: A Custom JumpStart Guide", *SunMicrosystems, Inc.; SunSoft Press, 1995*, (1995), 3 pages.

Neimeyer, P., et al., "Exploring JAVA", *O'Reilly and Associates, Inc.*, (1996),72-76.

Zoglin, Richard, "Pay-Per-View Starts Perking", *Time Magazine*; Mar. 6, 1989, (Mar. 6, 1989), 1 pg..

"ReExamination U.S. Appl. No. 90/008,517 Interview Summary as mailed Sep. 22, 2008", (Sep. 22, 2008), 3 pages.

"ReExamination U.S. Appl. No 90/008,517 Office Action in Ex Parte ReExamination mailed Jul. 28, 2008", (Jul. 28, 2008), 27 pages.

"ReExamination U.S. Appl. No. 90/008,517 Owner's Statement filed Sep. 20, 2007", (Sep. 20, 2007), 28 pages.

"ReExamination U.S. Appl. No. 90/008,517 ReExamination Application as filed Mar. 5, 2007", (Mar. 5, 2007), 134 pages.

"ReExamination U.S. Appl. No. 90/008,517 Reply to Owner's Statement filed Nov. 20, 2007", (Nov. 20, 2007), 62 pages.

"ReExamination U.S. Appl. No. 90/008,517 Response filed Sep. 26, 2008 to Ex Parte Office Action mailed Jul. 28, 2008", (Sep. 26, 2008), 42 pages.

* cited by examiner

SMART CARD PERSONALIZATION IN A MULTISTATION ENVIRONMENT

RELATED APPLICATIONS

This application is a continuation under 37 C.F.R. 1.53(b) of U.S. patent application Ser. No. 09/798,455, filed Mar. 2, 2001, now abandoned which is a continuation under 37 C.F.R. 1.53(b) of U.S. patent application Ser. No. 09/076,022, filed May 11, 1998 (U.S. Pat. No. 6,196,459), which applications are incorporated herein by reference.

FIELD OF THE INVENTION

The present invention relates generally to data storage devices and more specifically to the control of smart card personalization in a multistation environment.

BACKGROUND OF THE INVENTION

Increasing numbers of organizations which issue transaction cards to their users, customers, or employees require cards tailored to meet the requirements of their particular service or application. These organizations also want the cards to contain data about the cardholder. Existing transaction cards encode such data in a magnetic stripe on the back of the card but the amount of data that can be held by a magnetic stripe is limited. A new type of transaction card embeds a microprocessor computer chip in the plastic of the card to greatly increase the card's data storage capacity. Additionally, sophisticated card applications specific to the card issuer can execute in certain varieties of the chips, and the chip may also contain a type of operating system. Transaction cards with embedded chips are referred to in the industry as portable programmed data carriers, more commonly called "smart cards." The chip in a smart card is generally programmed with initialization and/or personalization data at the same time as the surface of the card is being embossed and/or printed.

The initialization data comprises three major types of information: application data, security data, and printed data. The application data is common to all cards for a given card application and includes application program code and variables. The security data prevents fraudulent use of the card and is usually provided in the form of "secure keys." Printed data, such as a logo, bar codes, and various types of numerical information, are placed on the surface of the card. Some or all of the same data can also be embossed on the surface. Optical technology also can be employed to make part or all of the surface of the card into a storage medium with data accessible by an appropriate optical reader.

Smart cards are also programmed with information specific to an individual cardholder through a process called "personalization." The personalization information for a smart card is similar to the personalization information currently contained on non-smart cards, such as the cardholder's name, account number, card expiration date, and a photograph. Because of its increased storage capacity, the chip in a smart card can contain additional data beyond the basic information on the standard transaction card including a graphical representation of the individual's signature, data defining the types of service the cardholder is entitled to, and account limits for those services.

Current systems from performing smart card initialization and/or personalization include a controller or a personal computer which is connected to a personalization station. All of the smart card programming data required for the personalization process is sent from the controller or personal computer to the personalization station which programs the smart card. An application running on the personalization station controls the programming of the smart card. Many current personalization stations have a limited capacity to handle the increasingly sophisticated personalization process as the size and functionality of smart card computer chips increase. Such limitations include the memory, processing capacity, and buffer size of the personalization stations.

In addition, personalization stations may require access to external resources which provide security services or access to card data. The external resources, particularly the security services, are expensive infrastructures to repeat for each personalization station. Also, communication between the personalization station and the external resource is limited by the speed of the communication link between them. In addition, the application development environment available on the personalization stations is often unique and lacking in development tools.

Therefore, there is a need for a personalization system which overcomes the limitations on memory capacity and processing flexibility of current personalization stations. There is also a need for a personalization system which can share external resources between multiple personalization stations.

SUMMARY OF THE INVENTION

The above-identified shortcomings as well as other shortcomings are addressed by the present invention, which will be understood by reading and studying the following specification. The invention is a computerized system for controlling programming of portable programmed data carriers across a plurality of personalization stations. The system includes a personalization server interface for acquiring services from one of more resources, transferring card information to one of the personalization stations and controlling the programming of the portable programmed data carrier. The system also includes a personalization station interface for receiving the card information from the personalization server interface and for programming the portable programmed data carrier.

The invention also described is a method of controlling programming of portable programmed data carriers in a system having a plurality of programming stations. The method includes receiving one or more card objects from a card issuer management system. The card objects consist of information for programming the portable programmed data carriers. The method also includes receiving a programming request from the programming station and utilizing the card object to control the programming station as the programming station programs the portable programmed data carrier.

Alternatively, the invention described is a computerized system which includes a means for receiving one or more card objects from a card issuer management system. The computerized system also includes a means for receiving a programming request from the programming station and a means for utilizing the card object to control the programming station as the programming station programs the portable programmed data carrier.

The smart card personalization system uses a data structure comprising a data field representing a card object containing information for programming a portable programmed data carrier and an additional data field containing a unique card object identifier for identifying the card object.

Therefore, the smart card personalization system of the present invention shares external resources between multiple personalization stations. Other aspects and advantages of the invention will become apparent by reference to the drawings and by reading the following detailed description.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures usually corresponds to the Figure number, with the exception that identical components which appear in multiple figures are identified by the same reference numbers.

The system of the present invention utilizes a personalization server to control smart card personalization in an environment having a plurality of personalization stations. The personalization server provides an interface to a plurality of card personalization stations and to external computing or data resources which normally are not directly available to the card personalization stations or which are not cost efficient to replicate at each card personalization station.

The detailed description of this invention is divided into four sections. The first section provides an overview of one embodiment of a system for issuing smart cards which incorporates a smart card personalization server of the present invention. The second section describes the functional specifications for the software components of the example embodiment of the smart card personalization system. The third section illustrates an example communication sequence between personalization station interface software and personalization server software for a smart card personalization process. The fourth section is a conclusion which includes a summary of the advantages of the present invention.

Figure 1:
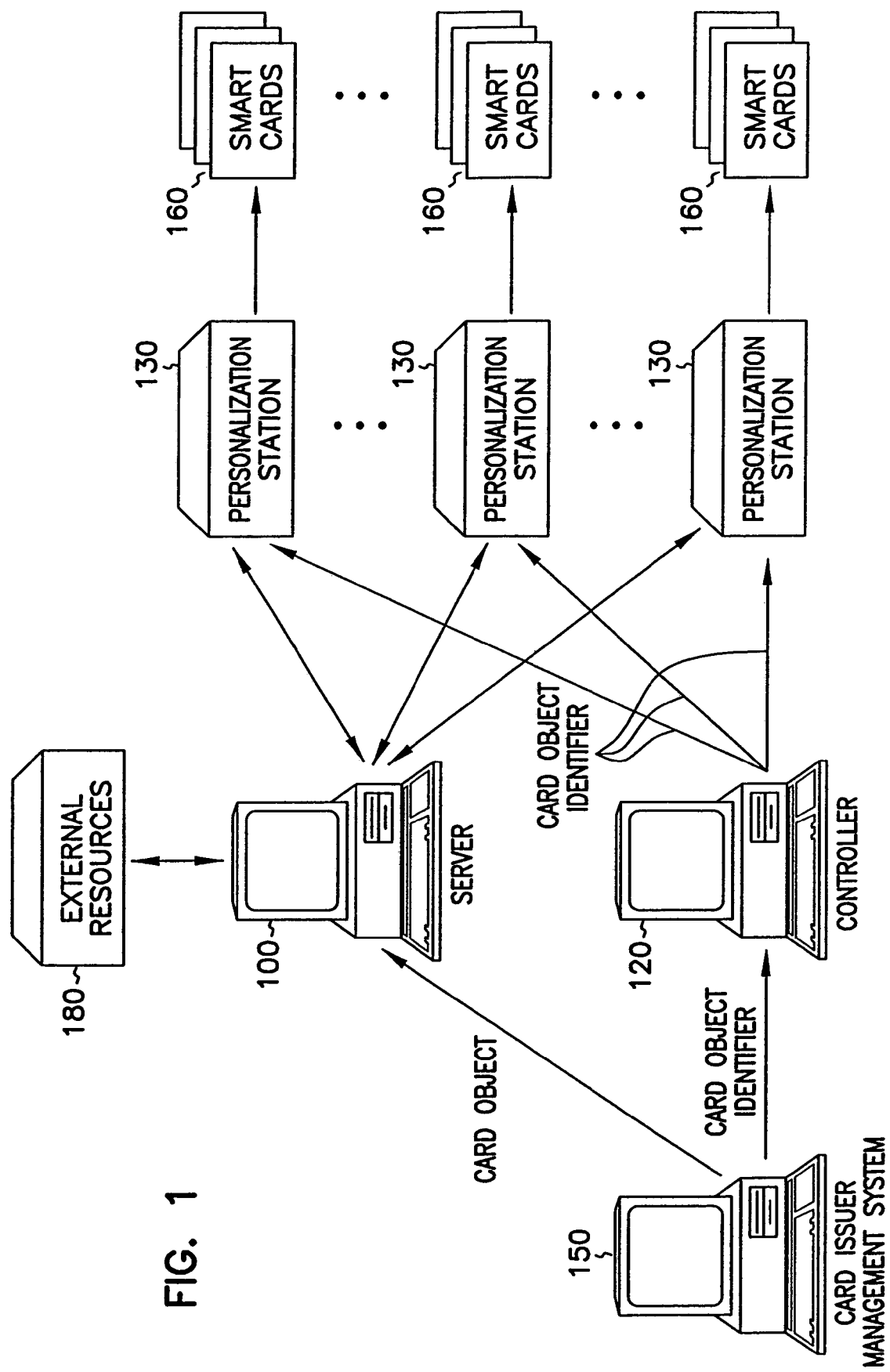
FIG. 1 is a block diagram representing an embodiment of a smart card issuing process that incorporates a smart card personalization server of the present invention.

Smart Card Personalization System Overview. FIG. 1 illustrates components of a smart card issuing process that incorporates one embodiment of the smart card personalization server of the present invention. The smart card personalization server 100 receives card objects from a card issuer management system 150. A smart card personalization controller 120 receives, from the card issuer management system 150, a card object identifier for each one of the card objects passed to the smart card personalization server 100. The smart card personalization controller 120 routes each one of the card object identifiers to one of a plurality of personalization stations 130. Each personalization station 130 uses the card object identifier to request data and services from the smart card personalization server 100 in order to personalize a smart card 160.

The card issuer management system 150 manages the cardholder data and determines the type of card to issue, the card applications to embed in the card, and what personalization equipment to use to issue the card for a particular cardholder.

The smart card personalization server 100 is illustrated in FIG. 1 as a computer executing personalization server software as further described below. The personalization server software executes under an operating system such as Unix, Windows 95©, or Windows NT©, and on industry-standard workstation and/or personal computer hardware. As described below, the smart card personalization server 100 provides an interface to card personalization stations 130 and to external computing or data resources 180.

The server 100 controls card printers, embossing devices, and integrated or add-on smart card interface devices collectively represented in FIG. 1 as a plurality of personalization stations 130. Personalization stations 130 also represent such devices as large volume card printer/embossers, small volume card printer/embossers, automatic teller machines (ATMs), point of sale terminals, unattended kiosks, personal computers, network computers, and on-line telecommunication devices. The physical connection between the devices and the smart card personalization server 100 varies according to the manufacturer and model of the device. Common industry standard connections include serial RS232, SCSI (Small Computer System Interface), Ethernet, and serial TTL (Transistor-Transistor Logic). In addition, some devices require a proprietary bus connection.

The connections between the smart card personalization server 100 and the card management system 150 and the stations 130 can also be implemented through standard local area networks, wide area networks, dedicated phone lines, or other remote communication infrastructure used to transfer data. Alternate connections will be apparent to those skilled in the art and are within the scope of the invention.

Figure 2:
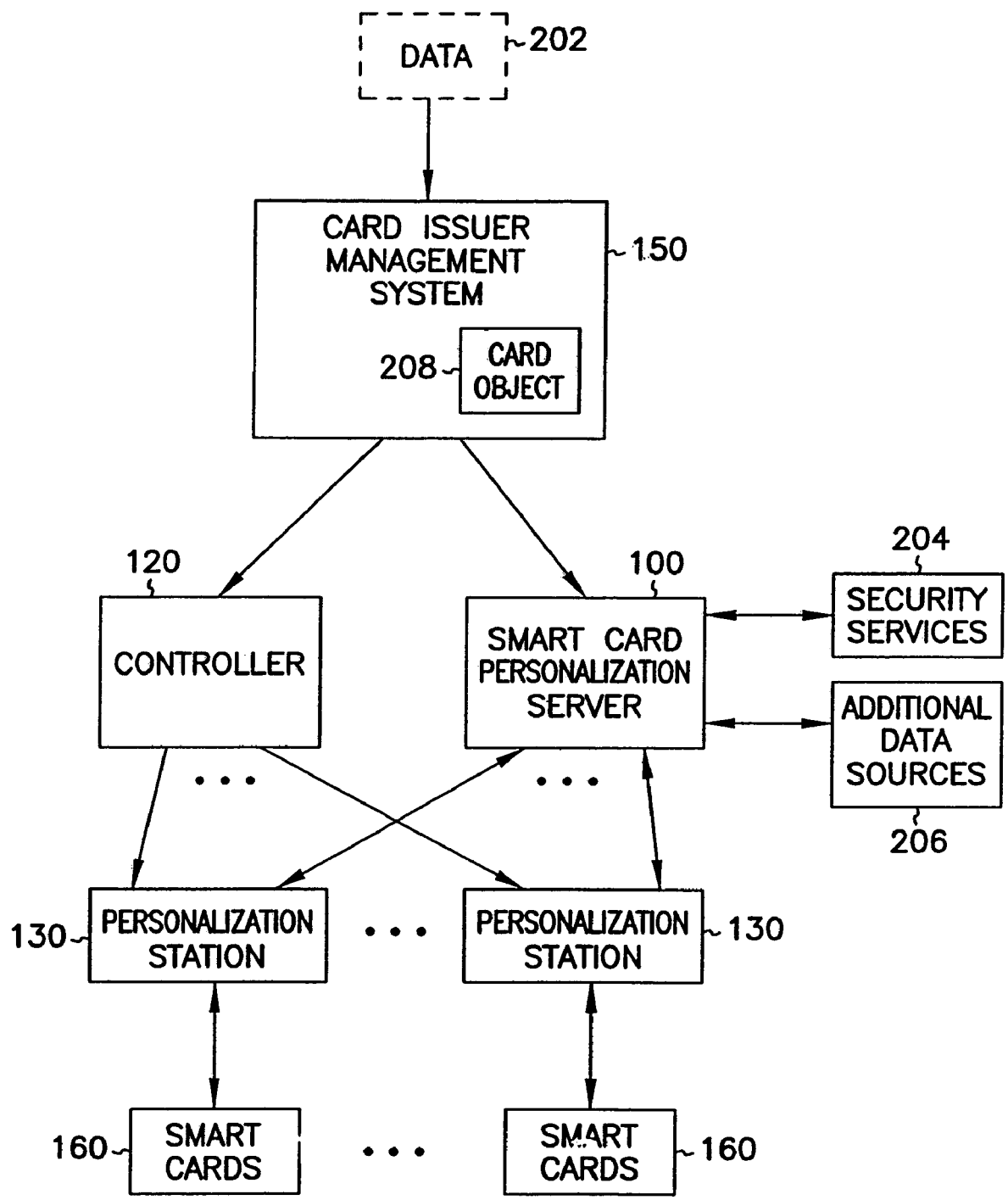
FIG. 2 is a functional block diagram of input and output connections for the embodiment of the smart personalization server of shown in FIG. 1.

FIG. 2 is a block diagram of one embodiment of the smart card personalization system illustrating the logical input and output connections for the smart card personalization server 100. The cardholder data 202 input and maintained by the card issuing organization contains information about each individual cardholder, such as name, account number, card expiration date, and applicable services. The card issuer management system 150 assembles the data necessary for each card personalization job. The data for each job can be stored in a card object data store, such as a database, with each card object 208 accessible by a unique card object identifier. A job can be, for example, a logical grouping of similar card objects.

The card objects 208 contain, for example but not with limitation, data and commands for magnetic stripe encoding, embossing, printing, packaging and smart card personalization. An example card object is shown below.

Card Object

EMB="123456789", "Your Name", "Jan. 1, 1999"
ENC=% B123456789^ Y/Name^ 0011999?;123456789=01011999?
PIC=www.photos.com/YourName
SCRD=this_unique_card_object_identifier The example card object begins with an emboss instruction "EMB" followed by the corresponding cardholder data to be embossed on the card. The second line in the example card object shown above is an encode instruction "ENC" followed by the corresponding data to be corresponding cardholder data to be encoded on the magnetic strip of the card. The third line in the example card object is an instruction to print a picture on the card "PIC" followed by the location of the cardholder's picture. The fourth line in the example card object is smart card portion of the card object "SCRD". The smart card portion of the card object 208 consists of the unique card object identifier.

The card issuer management system 150 passes the card object 208 to the smart card personalization server 100. The smart card personalization server 100 expects the personalization data to be in a particular format. Because the card object 208 is in a format defined by the card issuer that often differs from the format(s) expected by the server 100, the card object 208 is translated by the server 100 when necessary. One method of translating the card object is described in U.S. patent application Ser. No. 08/755,459 entitled "System and Apparatus for Smart Card Personalization", filed on Nov. 22, 1996.

The smart card personalization server 100 provides an interface to external security services 204 and additional data sources 206 as needed to perform a smart card personalization job. The software program for the smart card personalization server 100 can be coupled to the data sources 206 through standard data query commands that provide access to the data stored in the data sources. The communication protocols between the software program for the smart card personalization server 100 and the external security services 204 and the data sources 206 vary depending upon the underlying data management system or security system employed.

The smart card personalization server 100 also provides an interface to each one of a plurality of card personalization stations 130. The smart card personalization controller 120 passes a card object identifier to one of the waiting personalization stations 130. The personalization station 130 presents the card object identifier to the server 100 in order to initiate access to the data services, security services or support services needed to complete the smart card personalization. Upon receiving the card object identifier from the personalization station 130, the smart card personalization server 100 translates the card object indicated by the card object identifier. The translation of the card object by the smart card personalization server 100 results in a sequence of commands and/or data which are passed to the personalization station 130. The personalization station 130 passes the commands and data received from the server 100 directly to the smart card 160. An example process demonstrating how the server 100 controls the actual card programming is described below.

Figure 3:
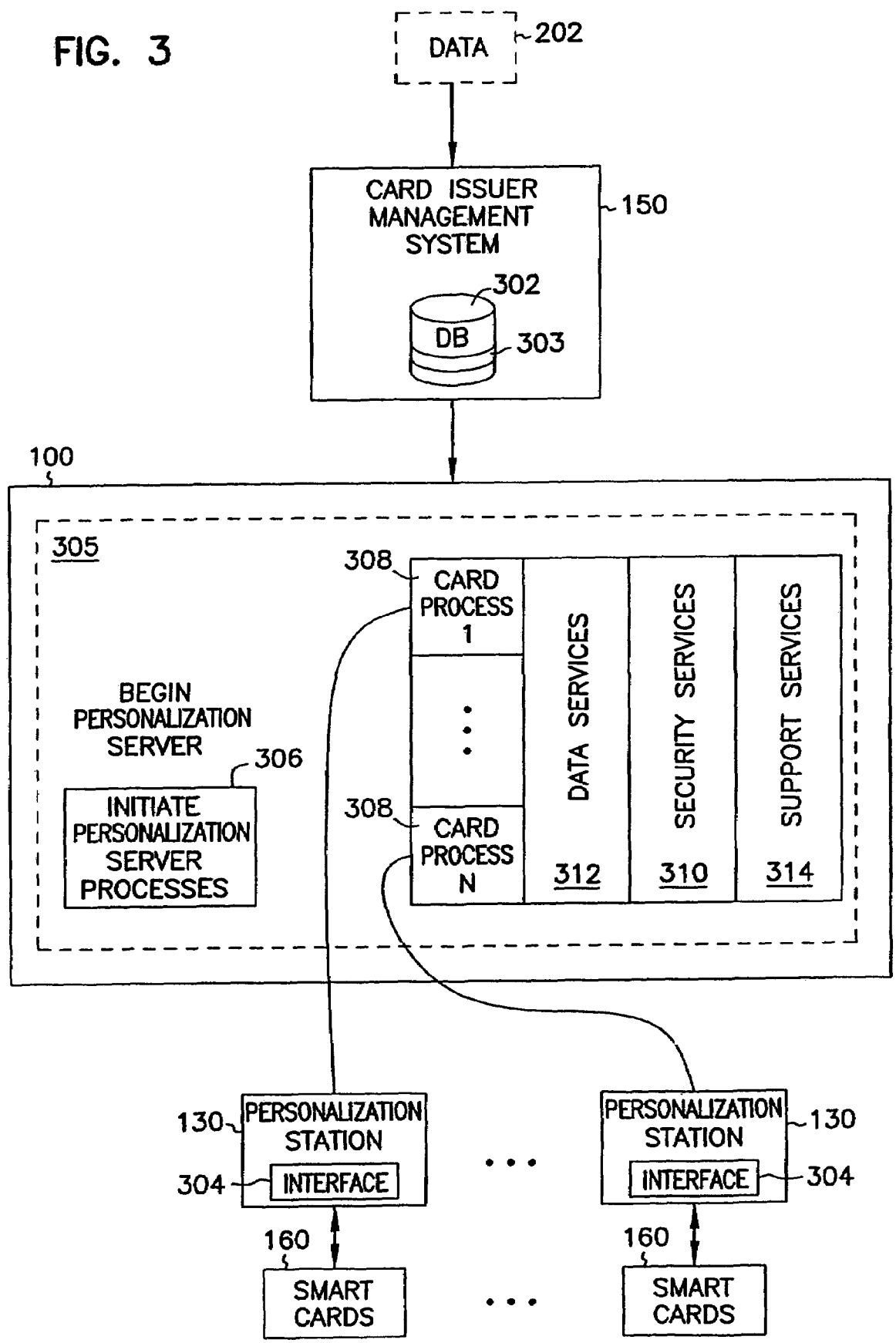
FIG. 3 is a block diagram showing one embodiment of the smart card personalization software of the present invention.

Personalization Software Specifications. FIG. 3 is a block diagram showing one embodiment of the smart card personalization server 100 of FIG. 2. The system of the present invention utilizes the personalization server 100 to control smart card personalization in an environment having a plurality of personalization stations 130 coupled to the personalization server 100. The personalization server 100 provides an interface to card personalization stations 130 and to external computing or data resources 204, 206 as shown in FIG. 2.

An application executing on a card issuer management system 150 prepares a card object 303 and assigns a card object identifier to each object. Information regarding the card objects is archived in a card object database 302 until called upon by the personalization server 100 to personalize a smart card.

The personalization environment of the present invention comprises two complimentary software components. The first is personalization station interface software 304 which executes in a processor of the personalization station 130. The second is personalization server software 305 executing in a processor in the personalization server 100 which processes the personalization card objects and utilizes both local and external resources.

A initialization process 306 initiates a personalization job by initiating the personalization server 100 and optionally sending data, such as embossing or magnetic stripe encoding data, to the personalization station 130. The personalization server software 305 serves multiple card personalization processes 308. Each card personalization process 308 represents a personalization job occurring at one of the personalization stations 130. Each card personalization process 308 is logically linked to one of the personalization stations 130.

The personalization station interface software 304 presents the unique card object identifier to the personalization server software 305 to initiate access to services available through the server software 305. The personalization server software 305 obtains all of the necessary job information as well as the data elements to be used in personalization of the smart card. The personalization station interface software 304 performs the card personalization utilizing the services available to it through the personalization server software 305 as required until personalization is complete. At completion of the job, the personalization station interface software 304 is notified by the server software 305 of completion.

The services provided by the server software 305 include data services 312, security services 310 and support services 314. The data services 312 perform the acquisition of data for each personalization job and include any commonly available means of accessing data. The data services 312 retrieve data archived in the card object data base 302 on the card issuer management system 150 as well as from additional external data sources as shown in FIG. 2. The data can be in the form of files, databases, or data structures for example.

The security services 310 interface with a variety of different external sources which provide security functions. The security functions provided by the external sources include any commonly available means of securing information or limiting access to smart card chips until a required security condition is met. An example security function utilizes one or more "secure keys" that are programmed into the chip to prevent fraudulent use of the card. The appropriate secure key data is obtained by the smart card personalization server software 305 from secure key records maintained by the card issuer or an external security source and then transferred to the personalization station interface software 304. The security services 310 also provide security functions that can be used, for example, to ensure the integrity and secrecy of data during the transmission of data to and from the personalization station 130.

The support services 314 perform processing tasks that in prior systems were performed by the personalization station 130 or were unable to be performed at all due to the limitations of the personalization stations. The support services 314 include any commonly used functions that can be shared between processes such as data conversions and validations for example. An example support service 314 is year 2000 date validation processing. An additional example of a support service 314 is formatting a ten digit string of numbers representing a telephone number so that the area code is in parentheses.

The personalization server software 305 operates on a computer system which includes one or more high speed processors, data communications capability compatible with the target personalization stations, access to external resources such as security or file servers and a multitasking operating system. The smart card personalization processes 308, identified as components of the personalization server software 305, utilize their own virtual memory and share resources as appropriate through threading or other common techniques well known to one skilled in the art.

In summary, the personalization server software moves the processing tasks for initialization and personalization of smart cards from the personalization station to the personalization server. The personalization station interface software is responsible for servicing individual commands from the personalization server software.

Figure 4:
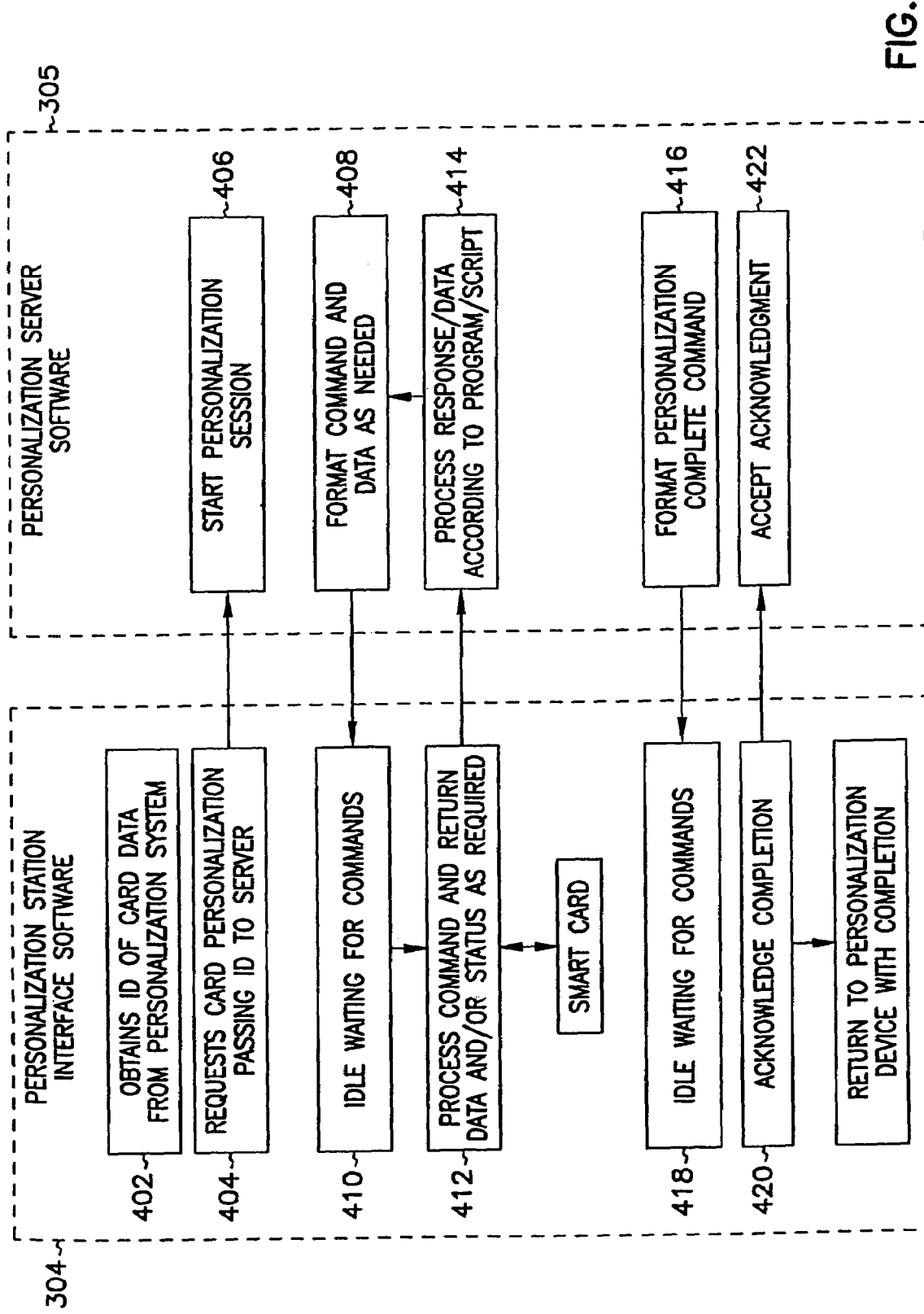
FIG. 4 is a high level flow chart for one embodiment of software which implements the functions of the smart card personalization server.

Personalization Software Communication Process. FIG. 4 illustrates the communication sequence between the personalization station interface software 304 and the personalization server software 305 in order to complete personalization of a smart card. The smart card personalization process begins at stage 402 when the personalization station interface software 304 receives a unique card object identifier from the smart card personalization controller as shown in FIG. 2. At stage 404, the personalization station interface software 304 requests the commands and data necessary to personalize the card by passing the card object identifier to the server software 305. Upon receiving the card object identifier, the server software 305 starts a personalization session with the personalization station interface software 304 at stage 406.

Based on the card object identifier, the server software 305 retrieves and sends the data and commands unique to the card being personalized to the personalization station interface software 304 at stage 408. The data and commands are retrieved locally from the smart card personalization server or from additional external data sources as shown in FIG. 2 including, for example, the card issuer management system 150.

In one embodiment, the personalization station interface software 304 is idle at stage 410 until it receives the commands and data from the personalization server software 305. Upon receiving the commands and data, the personalization station interface software 304 passes the commands and data directly to the smart card and returns data and/or status signals to the server software 305 as an acknowledgement at stage 412. An example of the data returned by the personalization station interface software 304 is a serial number unique to the card and a random number. The data in such case can be used as part of a function provided by a security service such as an authentication algorithm. At stage 414, the server software 305 processes the status signals and/or data returned by the personalization station interface software 304.

For example, at stage 408 the server software 305 sends a "select" command. The personalization station interface software 304 is idle at stage 410 until it receives the "select" command from the server. At stage 412, the personalization station interface software 304 passes the "select" command on to the smart card and returns a status signal as an acknowledgement to the server software 305. After receiving the acknowledgment at stage 414, the server software 305 sends a "write" command and associated data to the personalization station interface software 304 at stage 408. The personalization station interface software 304 is idle at stage 410 until it receives the "write" command from the server software 305. At stage 412, the personalization station passes the "select" command on to the smart card and returns a status signal as an acknowledgement to the server software 305. The loop from stage 408 to stage 410 to stage 412 to stage 414 continues until the personalization is complete.

Upon completion of the personalization of the smart card, the server software 305 sends a "format complete" command to the personalization station interface software 304 at stage 416. The personalization station interface software 304 is idle at stage 418 until it receives the "format complete" command from the server software 305. At stage 420 the personalization station interface software 304 sends an acknowledgement of the "format complete" command to the server software 305 and to the smart card. The personalization process is complete at stage 422 when the server software 305 receives the acknowledgement.

Conclusion. In summary, the system of the present invention utilizes a personalization server to control smart card personalization in an environment having a plurality of personalization stations. The personalization server provides an interface to a plurality of card personalization stations and to external computing or data resources which normally are not directly available to the card personalization stations or which are not cost efficient to replicate at each card personalization station. The personalization server off-loads the processing of tasks for initialization and personalization of smart cards from the personalization station to the personalization server. The personalization station is responsible for servicing individual commands from the personalization server.

An advantage of the present invention is that the personalization server can support multiple active personalization station sessions. An additional advantage is that the programming logic required in the personalization station is reduced to that of managing data transfers.

Other mechanisms for control of the smart card personalization process will be apparent to those skilled in the art. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of controlling programming of portable programmed data carriers in a system having a plurality of programming stations, the method comprising the steps of:
   receiving a card object from a card issuer management system, wherein the card object comprises information for programming the portable programmed data carriers;
   receiving a programming request from the programming station; and
   utilizing the card object to control the programming station as the programming station programs the portable programmed data carrier.

2. The method of claim 1, further comprising the step of acquiring data from a data source.

3. The method of claim 2, wherein the data source is the card issuer management system.

4. The method of claim 2, further comprising the step of acquiring security services from a security source.

5. The method of claim 4, further comprising the step of providing support services.

6. The method of claim 5, wherein the step of receiving a programming request comprises the steps of:
   receiving a card object identifier; and
   associating the card object with the card object identifier.

7. The method of claim 1, further comprising the step of acquiring security services from a security source.

8. The method of claim 1, further comprising the step of providing support services.

9. The method of claim 1, wherein the step of receiving a programming request comprises the steps of:
   receiving a card object identifier; and
   associating the card object identifier with the card object.

* * * * *